US007766520B2

(12) United States Patent
Bornhorst

(10) Patent No.: US 7,766,520 B2
(45) Date of Patent: Aug. 3, 2010

(54) LIGHTING UNIT WITH REPLACEABLE AND ROTATABLE LENS

(75) Inventor: James Bornhorst, DeSoto, TX (US)

(73) Assignee: Production Resource Group, LLC, New Windsor, NY (US)

( * ) Notice: Subject to any disclaimer, the term of this patent is extended or adjusted under 35 U.S.C. 154(b) by 200 days.

(21) Appl. No.: 11/539,132

(22) Filed: Oct. 5, 2006

(65) Prior Publication Data

US 2007/0147054 A1 Jun. 28, 2007

Related U.S. Application Data

(60) Provisional application No. 60/724,493, filed on Oct. 6, 2005.

(51) Int. Cl.

| | |
|---|---|
| ***F21S 8/00*** | (2006.01) |
| ***B60Q 1/06*** | (2006.01) |
| ***F21V 21/26*** | (2006.01) |
| ***F21V 21/29*** | (2006.01) |

(52) U.S. Cl. ....................... 362/427; 362/269; 362/275; 362/426; 362/428

(58) Field of Classification Search ................. 362/427, 362/426–428, 269, 275

See application file for complete search history.

(56) References Cited

U.S. PATENT DOCUMENTS

| | | | | |
|---|---|---|---|---|
| 4,037,097 | A * | 7/1977 | Stillman et al. | 362/324 |
| 5,515,254 | A * | 5/1996 | Smith et al. | 362/293 |
| 5,622,426 | A * | 4/1997 | Romano et al. | 362/281 |
| 5,904,417 | A * | 5/1999 | Hewett | 362/321 |
| 6,079,853 | A * | 6/2000 | Evans | 362/324 |
| 6,113,252 | A * | 9/2000 | Arlitt et al. | 362/365 |
| 6,241,366 | B1 * | 6/2001 | Roman et al. | 362/293 |
| 6,834,982 | B2 * | 12/2004 | Dedoro | 362/268 |
| 6,866,402 | B2 * | 3/2005 | Belliveau | 362/272 |
| 7,011,435 | B1 * | 3/2006 | Blaymore | 362/382 |
| 7,364,324 | B2 * | 4/2008 | De Sisti | 362/269 |
| 2002/0159262 | A1 * | 10/2002 | Romano et al. | 362/345 |
| 2004/0095761 | A1 * | 5/2004 | Esakoff | 362/226 |
| 2006/0163945 | A1 | 7/2006 | Bornhorst et al. | |

* cited by examiner

*Primary Examiner*—Jacob Y Choi
*Assistant Examiner*—David J Makiya
(74) *Attorney, Agent, or Firm*—Law Office of Scott C. Harris Inc.

(57) ABSTRACT

A lighting unit with a replaceable and rotatable lens. The lens unit can be removed and replaced. A lens rotating motor is off axis, and is counterbalanced by the light bulb holding structure that is located at the other side of the lighting unit.

17 Claims, 9 Drawing Sheets

LIGHTING UNIT WITH REPLACEABLE AND ROTATABLE LENS

CROSS-REFERENCE TO RELATED APPLICATIONS

This application claims priority to U.S. Application Ser. No. 60/724,493, filed on Oct. 6, 2005. The disclosure of the prior application is considered part of (and is incorporated by reference in) the disclosure of this application.

BACKGROUND

Moving lights are generally known in which the light is remotely controllable to allow the light to move to, and hence point at, a number of different locations. The directions of movement of the light is generally referred to as pan and a substantially orthogonal tilt direction. By moving in both pan and tilt, a properly adjusted light can generally move in more or less any direction.

Many features are often placed in these lights, causing different kinds of problems. The complication of these lights also leads to extremely high cost.

SUMMARY

The present application describes a relatively simplified moving light with replaceable parts.

DETAILED DESCRIPTION

The general structure and techniques, and more specific embodiments which can be used to effect different ways of carrying out the more general goals, are described herein.

Figure 1:
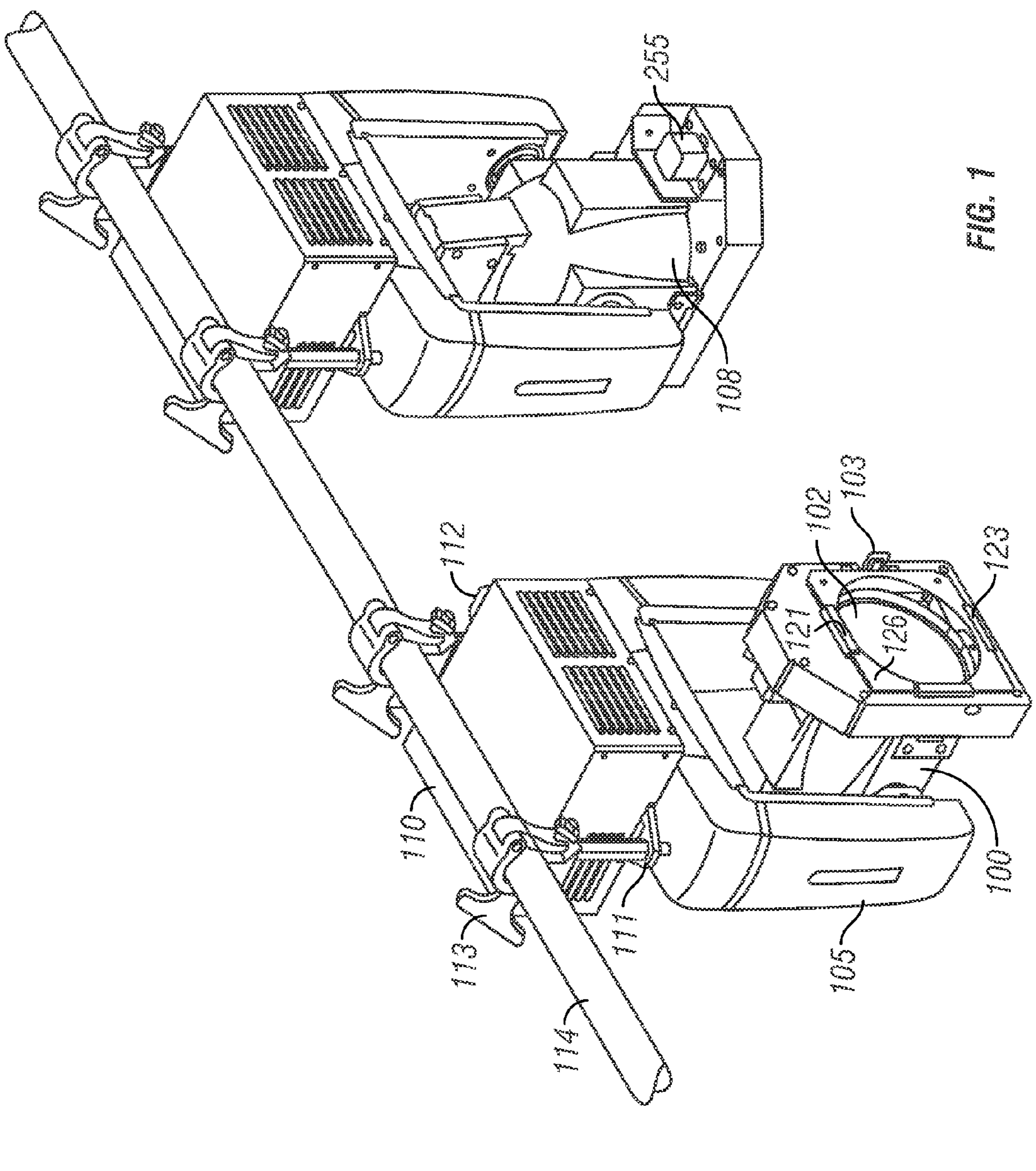
FIG. 1 illustrates an overall diagram of the lamp as assembled and hanging.

The basic system of the embodiment is a movable lamp of the type shown in FIG. 1. The overall device includes three basic parts: the lamp housing 108, the yoke 105 which allows moving the lamp housing in generally orthogonal pan and tilt directions, and a cooled upper enclosure part 110 which includes the controller part. The upper enclosure 110 includes the ballast as well as the electronic controls as described herein. The upper enclosure also includes at least one mounting part 111, but preferably two symmetrical mounting parts 111, 112 which allow connection of truss hooks shown as 113. The truss hooks connect to the connection parts such as 111, and enable hanging the light on a truss 114.

The yoke part 105 includes motors therein which move the position of the lamp unit 100 based on an applied command. In the embodiment, the pan and tilt motion is controlled by three-phase stepper motors.

In the embodiment, colors projected by the device are not remotely selectable. However, the device also includes a gel frame holder, formed of gel frame retaining parts 121, 122, 123, at three edges surrounding the area where the light beam shines. These parts 121, 122, 123 form surfaces that hold a coloring gel into place, and facilitate inserting a gel 126 of any desired color into the area of the beam. A handle 103 forms the final area retaining the gel, maintaining the gel in place.

The gel 126 can be removed by sliding out the gel under the inner surfaces of the retaining parts such as 121.

The gel frame can receive standard colored gels, thereby enabling changing the color of the projected light.

In addition, a lens area 102 holds a lens, which is also held in place by handle 103. Handle 103 allows compressing a spring that can be used to release the lens.

Different glass lenses may be included in the lens area 102, which enable different effects as described herein. Exemplary lenses may include a narrow spot lens, a very narrow spot lens, and lenses with different lenticular characteristics.

Figure 2:
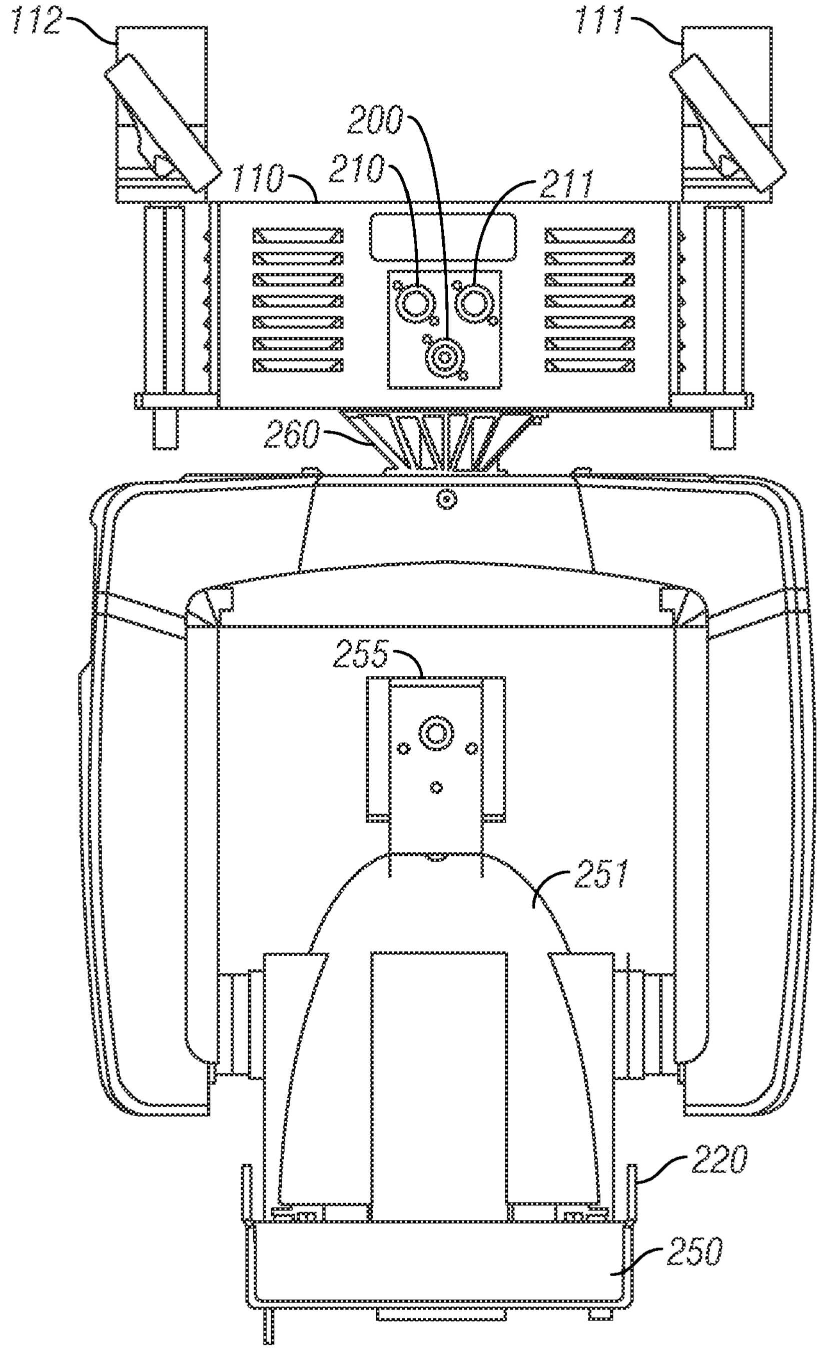
FIG. 2 shows a front view of the lamp.
Figure 4:
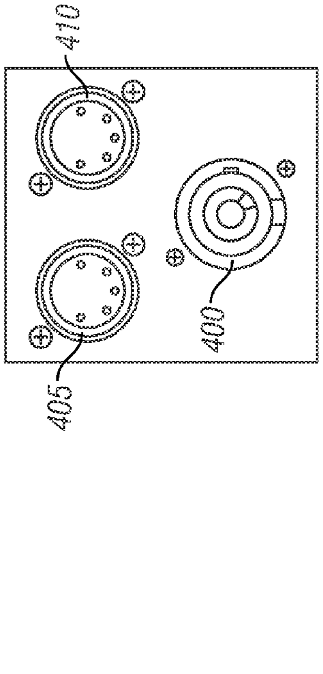
FIG. 4 shows a detailed close-up of the upper enclosure connection of the lamps.

FIG. 2 illustrates a view from the opposite side of the unit. A reflector assembly 251 surrounds the lamp, and reflects the light therefrom along an optical axis which passes through the lens and area of the color gel and passes through the front face 250. FIG. 2 shows how the rear side of the controller part 110 includes a power connection 200 as well as DMX in 210 and DMX out 211. FIG. 4 shows a detailed view of the upper enclosure connections. FIG. 21 also shows a lens rotation motor 255 which is located on an extending portion of the front surface of the lamp. The lens 102 can be rotated by the rotation of motor 255.

In the embodiment, the rear part of the light, 255 includes a back assembly which includes beam adjustment controls and access to lamp for replacement.

Figure 3:
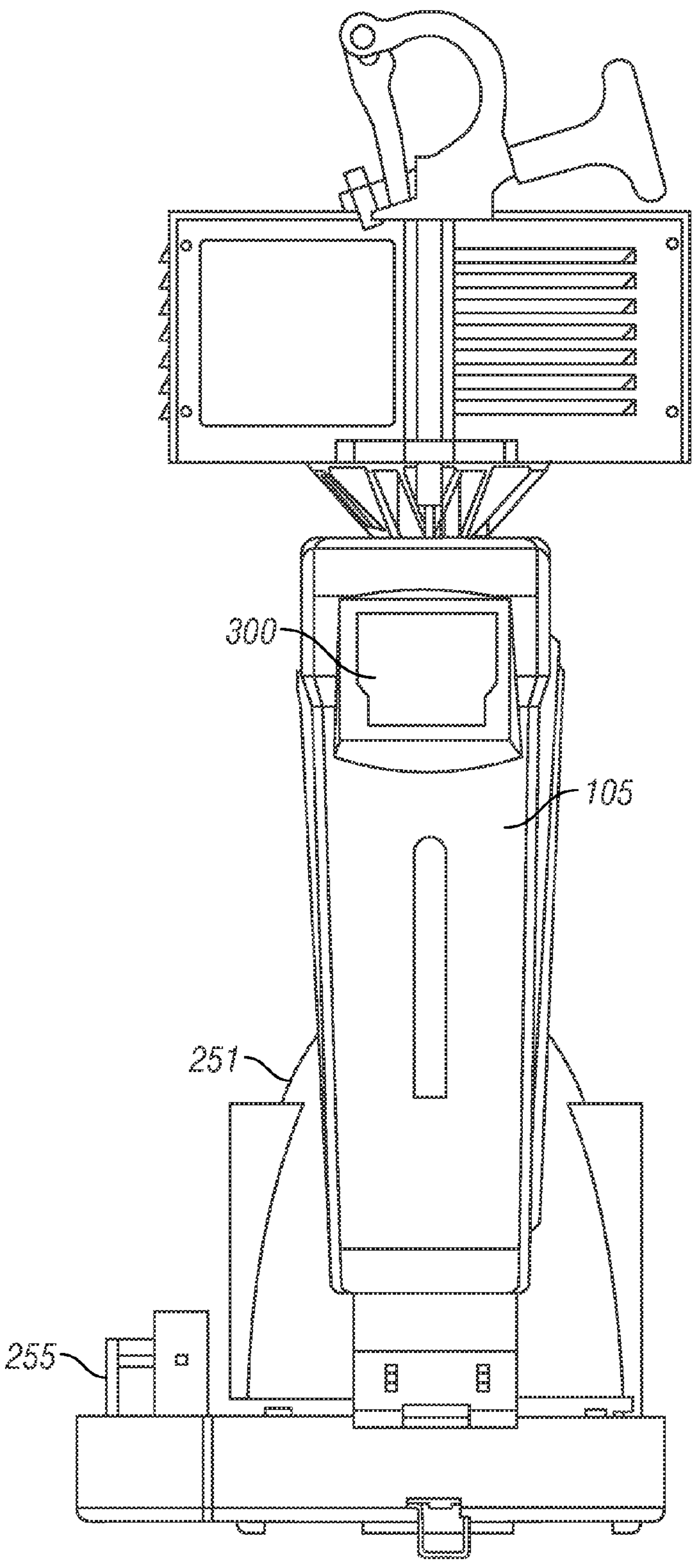
FIG. 3 shows a side view of the lamps.

The yoke assembly may also hold a master control board, and may have a menu display thereon. FIG. 3 illustrates the side view of the yoke 105 showing the menu display 300 which is used to configure the luminaire as necessary. This may provide the DMX address, as well as other status information of various types.

Figure 5:
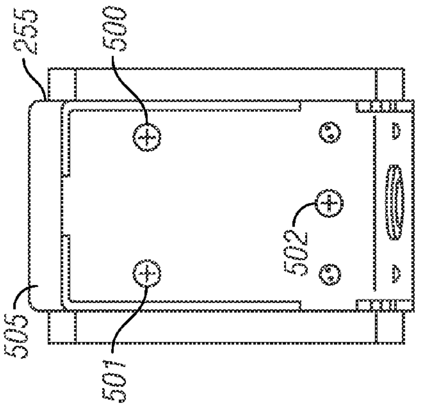
FIG. 5 shows up beam adjustment control system.

FIG. 5 illustrates a detailed view of the beam address adjustment control module. In addition, since the beam adjustment control module is on a completely different side of the lamp, it tends to balance against the front end, and allow compensating the extra weight and unbalance in the front that is caused by the nonsymmetrical placement of motor 255. In an embodiment, the beam adjustment control module is sized to substantially balance an imbalance caused by the nonsymmetrical front surface.

Figure 8:
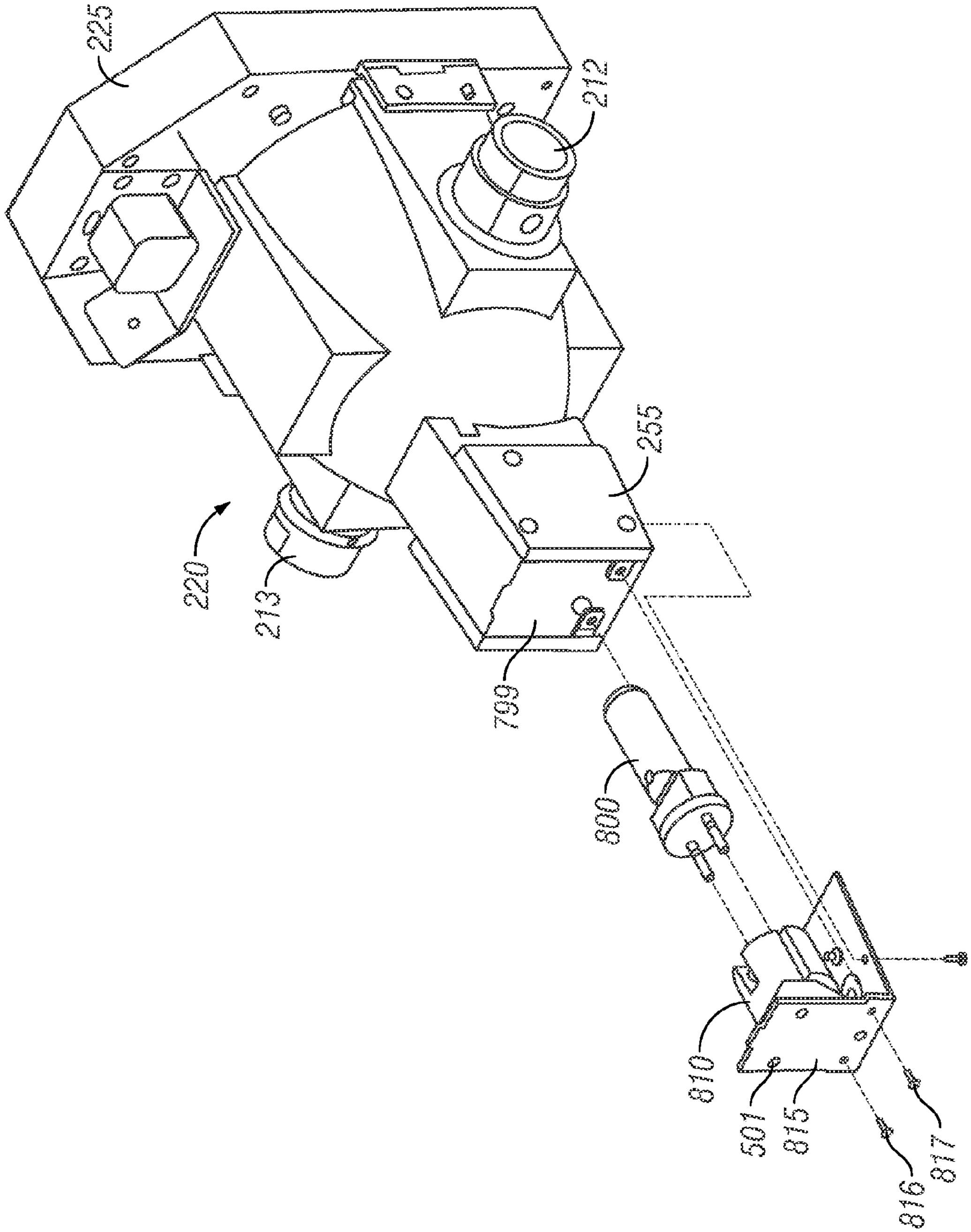
FIG. 8 shows the exploded version of the lamp head.

Beam adjustment is carried out by changing the position of the beam adjustment screws 500, 501, 502. In addition, the cover 505 can be removed in order to obtain access to the lamp, as shown in FIG. 8.

Hence, the upper enclosure 110 includes the connections, cooling and ballast. A connection area on both sides of the upper enclosure 111, 112 allows connection of hooks in a symmetrical way. Another connection area at the bottom of the enclosure is shown as 260, and connects between the upper enclosure 110 and the yoke assembly 105. The yoke assembly includes an area 300 for the menu display, allowing this to be separated from the heat and connections. In addition, the lamp assembly 220 is connected to the yoke 105 assembly, and power thereby.

The upper enclosure connection also includes AC power connector 400, as well as data in 405 and data out 410. The connectors which are used in this embodiment are five pin XLR connectors, and form daisy-chain connections. The data connection may use the DMX 512 specification. As well known, this may include a female data in connector 405, and a male data through connector 410. Each of the connectors includes a shield at pin 1, twisted-pair 1 across pin 2/3 with positive on pin 3, and twisted pair wire 2 on pin 4/5 with positive on pin 5. As conventional, an XLR termination connector needs to be placed across the termination connector 410 if no additional luminaires will be daisychained into the chain. Resistors need to go between pins 2/3 and 4/5; each resistor being a 120 ohm resistor.

Figure 6:
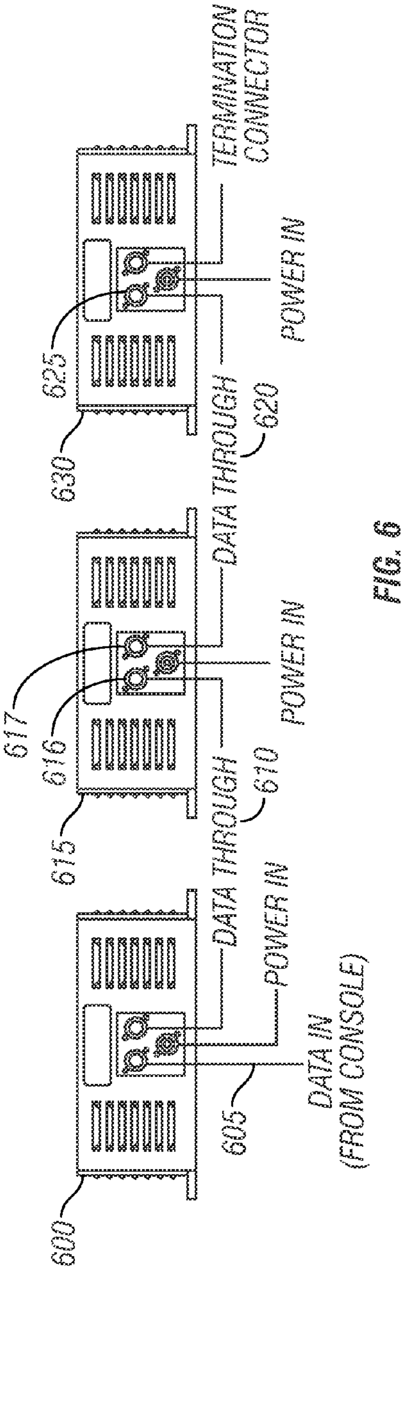
FIG. 6 shows a connection of data in a daisy chain configuration.

FIG. 6 illustrates an exemplary daisychain connection, with unit 600 receiving the data in 605 from the console/controller, daisychained through 610 to the power in of unit 605, daisychained out at 617 through the daisychained connection 622 to the data-in connection 625 of unit 630.

Figure 7:
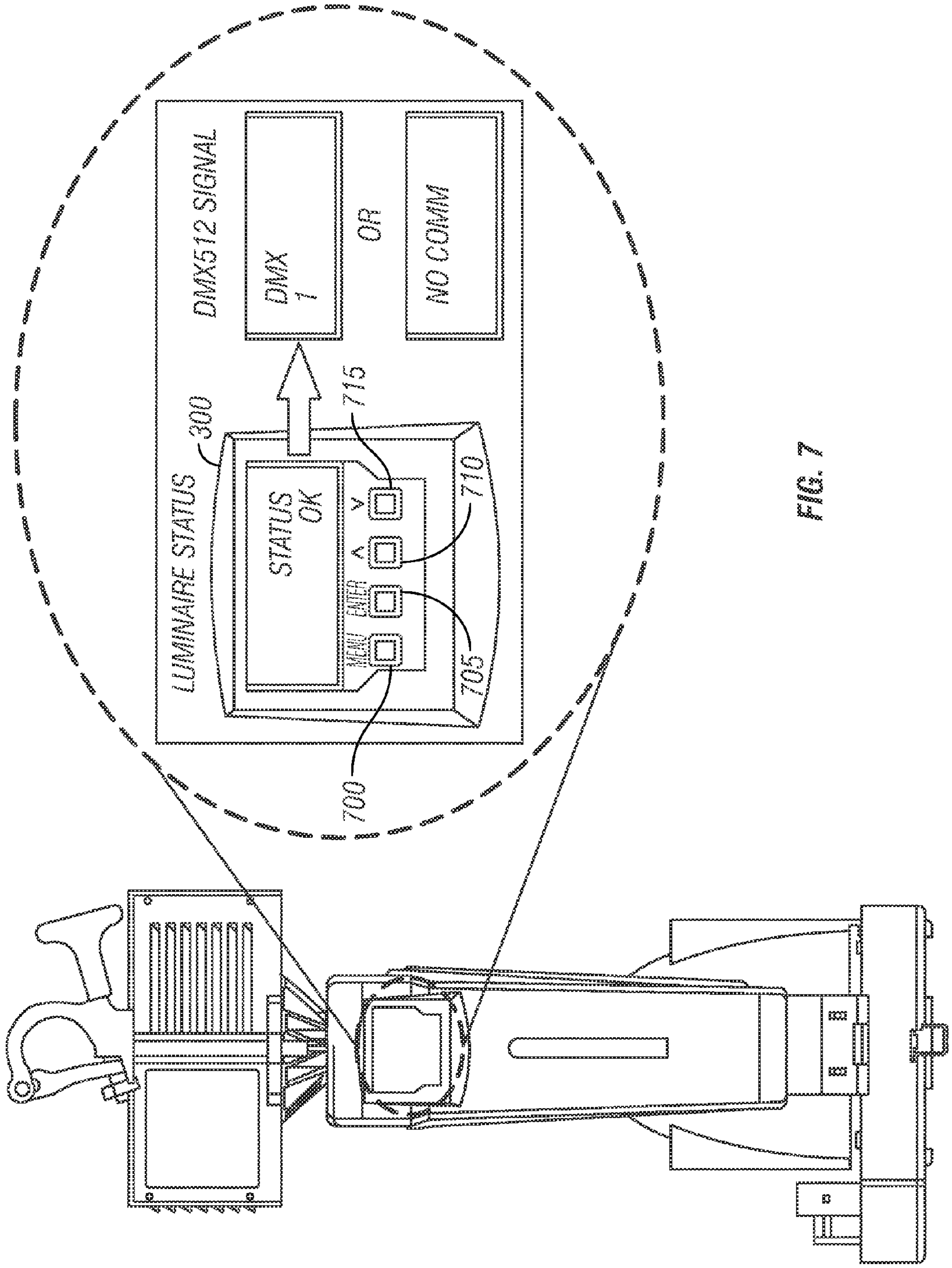
FIG. 7 shows a menu display on the yoke of the lamps.

As described above, the yoke 105 includes menu display 300. The menu display can show various information including status of the unit, and others. FIG. 7 illustrates a detailed view of the menu. The menu unit 300 includes four buttons, menu 700, enter 705, up 710, and down 715. Upon power up, the display menu typically displays "status okay", and then after a few seconds automatically changes to a DMX address or the words "no," if an address has not been set or no DMX signal is detected. The lamp can be struck remotely by entering the DMX address from the console.

In addition, the DMX starting address can be set, by entering the menu function, scrolling to the DMX menu, scrolling to the address menu, and entering the edit mode. Other menu functions may include the status of the fixture, and its serial number, software version, and total operation hours, calibration status, DMX menu, address menu, the reverse tilt option which changes the sense of tilt to the opposite sense that is commanded, the reverse pan option which allows setting the menu to the opposite pan sense to that actually received, and the timing channel mode.

The different DMX start addresses effect the way the addresses are interpreted. Tables 1 and 2 illustrates the basic profile both with no timing channels, and with timing channels. Tables 1 and 2 illustrate DMX start address of 1, but different start addresses can be used which lead to different channels. Note that the timing channels may include focus time and beam time.

TABLE 1

| DMX Channel | Function | Default | Virtuoso ® Control |
|---|---|---|---|
| 1 | Intensity | 0 | (dummy channel) |
| 2-3 | Pan | 32767 | Pan |
| 4-5 | Tilt | 32767 | Tilt |
| 6 | Lens | 0 | Beam |
| 7 | Control | 0 | Start/Douse/Reset |

TABLE 2

| DMX Channel | Function | Default | Virtuoso ® Control |
|---|---|---|---|
| 1 | Intensity | 0 | (dummy channel) |
| 2-3 | Pan | 32767 | Pan |
| 4-5 | Tilt | 32767 | Tilt |
| 6 | Lens | 0 | Beam |
| 7 | Focus Time | 0 | (timing channel) |
| 8 | Beam Time | 0 | (timing channel) |
| 9 | Control | 0 | Start/Douse/Reset |

Special control channels are also supported. For example, reset turns off all luminaire mechanisms. Douse turns the lamp off and start strikes the land. Each of these functions can be controlled remotely.

The timing channel control may allow for a smoother transition and movement of the mechanisms in the luminaire. For example, a timing control channel may allow the luminaire to use its timing channel to calculate a smooth and continuous movement for different time and transition. Alternatively, the console may calculate this timing and transition; for example, the console may calculate the time duration between the increments to be sent for time and transition. Either timing channel or console timing may be used.

A timing value of zero in the embodiment may correspond to full speed, and a timing value of 100%, DMX value of 255, allows the parameter to follow the console time rather than the timing channel itself. Values between those values may also be used. For example, DMX value 20 is 8% value, and corresponds to four seconds to make a move. DMX value 61 corresponds to 24%, or 14 seconds. DMX vale 252 corresponds to 99% or 310 seconds.

FIG. 8 illustrates a detailed view of the head assembly 220. The head assembly as previously described includes the front portion 225, and the back 255. The head assembly also pivots on arms 212, 213 under control of the yoke.

The backcap assembly 255 includes an opening 799 into which the lamp 800 is located. In the embodiment, the lamp is an MSR 700 W lamp. The lamp is held within a socket 810, which is attached to the back portion of the back assembly. Screws 816, 817 hold the back assembly into place. Note also that the screws such as 501 are on the back adjustment, and operate to allow alignment of the lamp. In operation, the adjustments should attempt to align the hotspot within the beam.

Figure 9:
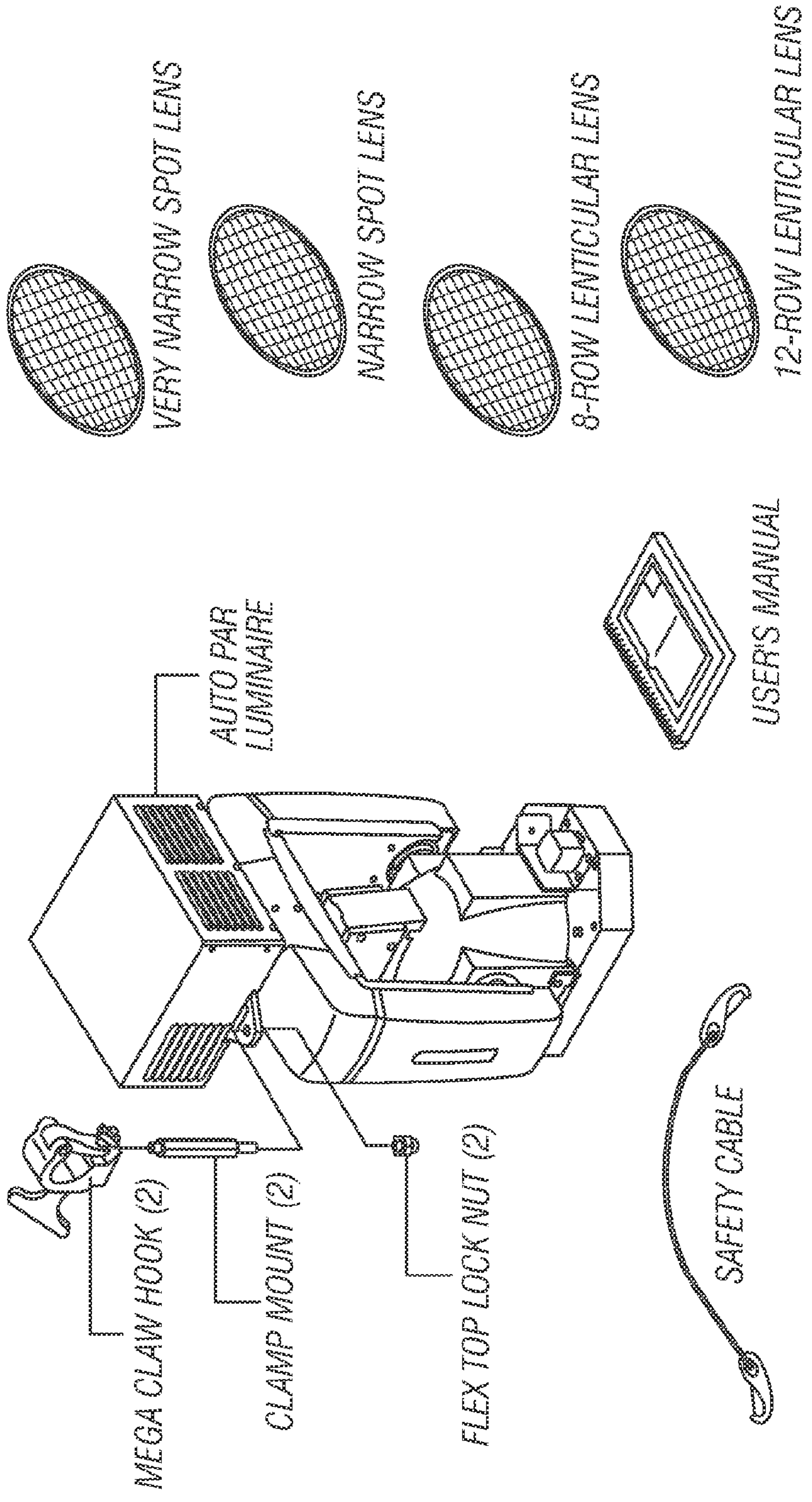
FIG. 9 shows the different lenses which may be available as a kit.

FIG. 9 illustrates the different lenses which may be used including a very narrow lens, a narrow lens, and an 8-Row lenticular lens and a 12-Row lenticular lens, as shown in FIG. 9. These lenses may be included as part of a kit that is provided with the unit. The different lenses provide different beam lengths and beam angles, as shown in table 3.

TABLE 3

| LENS | CANDELA (cd)** | BEAM ANGLE (degrees) | BEAM (Tn)* | FIELD ANGLE (degrees) | FIELD (Tn)* |
|---|---|---|---|---|---|
| VNSP | 1,625,000 | 5° | 0.087 | 14° | 0.246 |
| NSP | 1,155,000 | 7.5° | 0.131 | 15° | 0.263 |
| 8-Row Horiz | 360,000 | 18° | 0.317 | 31° | 0.555 |
| 8-Row Vert | 360,000 | 12° | 0.210 | 23° | 0.407 |
| 12-Row Horiz | 140,000 | 31° | 0.555 | 50° | 0.933 |
| 12-Row Vert | 140.000 | 21° | 0.371 | 33° | 0.592 |

*Multiply throw distance by Tn to determine coverage

** To calculate center beam illuminance (I) at a specific distance (D):

$$I = \frac{cd}{D^2}$$

if (D) is in feet. (I) is in foot candles
if (D) is in meters. (I) is in lux

Figure 10:
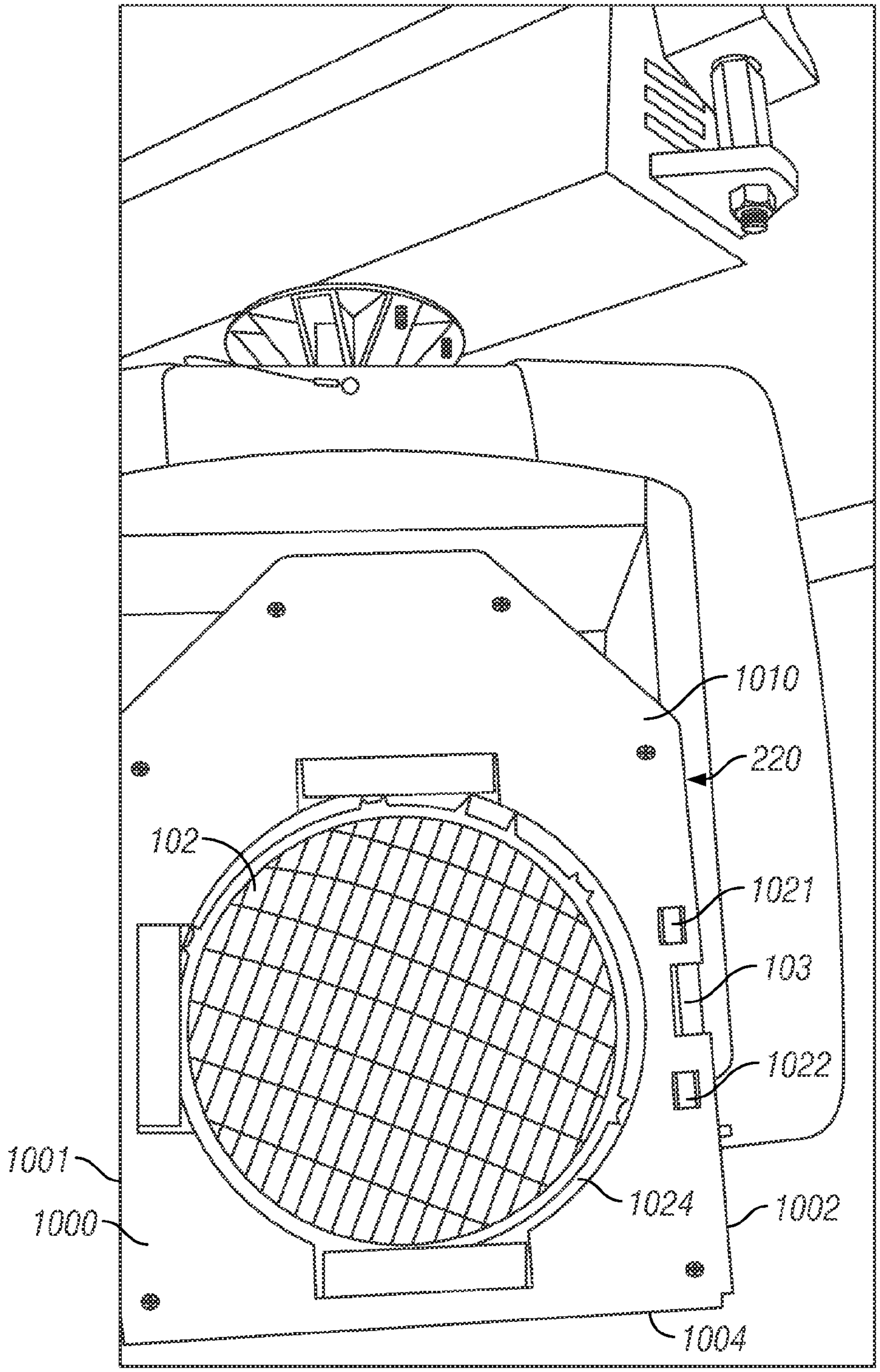
FIG. 10 illustrates a removable lens and shell holder.

FIG. 10 illustrates the front face of the head assembly 220. The front face has is formed of a symmetrical part and an asymmetrical part. The symmetrical part is symmetrical relative to the lens opening. There are two parallel sides 1001, 1002 and a substantially perpendicular part 1004 extending between those two sides. Each of the sides 1001, 1002, 1004 are more or less uniformly separated from the lens opening.

The lens is located within a substantially round hole within the front surface 1000. The lens removal part 103 which includes spring-loaded tangs as shown in the picture. The springs, 1021, 1022 can be compressed using the handle 103. After the part 103 is pressed, the securing ring 1024 is removed, and then the lens 102 can be also removed and a new lens can be inserted. The lens has raised areas on the back of the lens which are aligned with the notches in the lens installation ring. Then the ring is reinstalled and the handle is reinserted.

Figure 11:
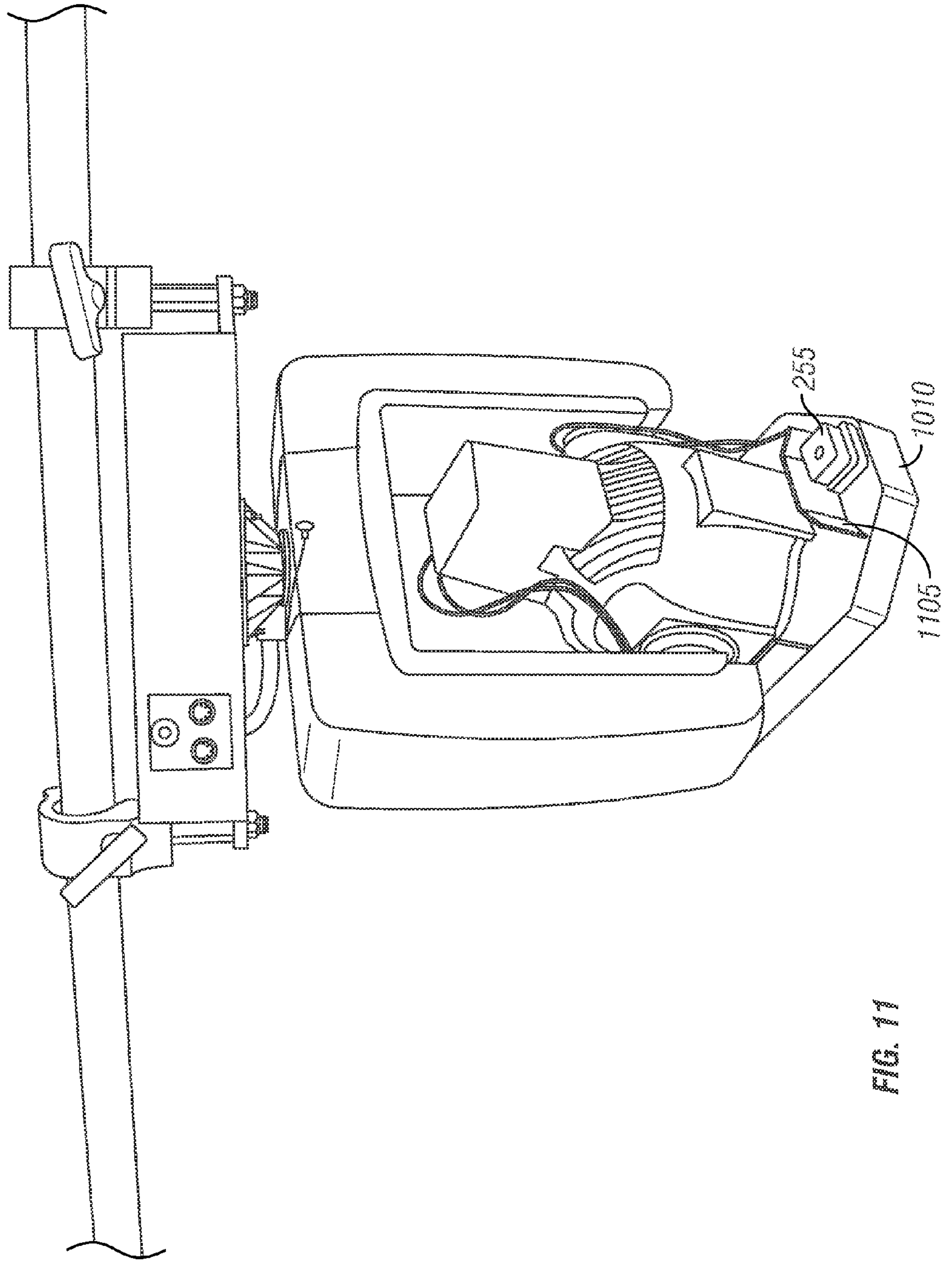
FIG. 11 shows a lens rotating part.

As can be seen in FIG. 10, the front surface of the light forms a first symmetrical part, e.g., a square, and a second assymetrical part, called an additional extra area 1010. Extra area 1010 may be a trapezoidal shaped area that makes the overall shape of the front surface asymmetrical, and provides a location for mounting of the lens rotation motor 255. FIG. 11 shows the lens rotation motor 255 mounted in its mounted location on the assymetrical portion. The rear portion of extra area 1010 effectively forms a mounting surface 1105, allowing the lens rotation motor 255 to be mounted in a location where it can move the lens. Also, importantly, the back assembly can offset at least some of the weight imbalance that would otherwise be caused by the non-symmetrical shape and mounting of the front face. Other balancing can also be made.

The general structure and techniques, and more specific embodiments which can be used to effect different ways of carrying out the more general goals are described herein.

Although only a few embodiments have been disclosed in detail above, other embodiments are possible and the inventor (s) intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, different controls and effects may also be possible. Also, other balancing structures that compensate completely or partially for the weight imbalance may be used to compensate for the non-symmetrical arrangement and structure of the front face.

Also, the inventor intends that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation.

The computer which operates the console and/or the lights may be a Pentium class computer, running Windows XP or Linux, or may be a Macintosh computer or a controller chip. The programs may be written in C, or Java, or any other programming language. The programs may be resident on a storage medium, e.g., magnetic or optical, e.g. the computer hard drive, a removable disk or other removable medium. The programs may also be run over a network, for example, with a server or other machine sending signals to the local machine, which allows the local machine to carry out the operations described herein.

What is claimed is:

1. A lamp comprising: a lamp housing having a lamp front surface, having inner surfaces defining a substantially round opening, and said inner surfaces defining said opening including at least one surface for rotatively holding a lens, said lamp housing also having a rear outer surface surrounding said round opening and including a first portion on a first side of said lens, a second portion on a second side of said lens, opposite said lens from said first portion, and said second portion being substantially the same area and shape as said first portion, a third portion on a third side of said lens adjacent to said first portion and said third portion being substantially the same area and shape as said first portion, and a fourth portion on a fourth side of said lens adjacent to said first portion and opposite to said third portion, said fourth portion having a different area than any of said first, second or third portions, and being non-symmetrical relative to any of said first, second and/or third portions, said fourth portion defining a mounting surface on an opposite side of said lamp housing to said front surface, said mounting surface adjacent said opening, but offset therefrom in an area which is off center and asymmetrical on the lamp housing relative to an axis defined between said first and second portions; a lens rotating motor, mounted on said nonsymmetrical mounting surface, and connected to operate in a way that allows rotating said lens, said lens rotating motor having a portion that extends outside said lamp housing, on an opposite side of said lamp housing, and said lens rotating motor facing in a direction opposite to a direction of light projection; a reflector assembly, located adjacent said front surface, in a location to shine light through an area of said opening; a back assembly, coupled to a rear surface of said reflector assembly, and including a light socket that is operative to hold a light bulb in a location within said reflector, said back assembly extending by an amount that is effective to counterbalance at least a portion of an imbalance caused by the off center mounting of said lens rotating motor; and a yoke, coupled to said lamp housing, and operative to move said lamp housing in substantially pan and tilt directions.

2. A device as in claim 1, further comprising an upper enclosure, coupled to said yoke and separated therefrom, said upper enclosure connection part which allows connecting the lamp device to a supporting truss.

3. A device as in claim 2, wherein said back assembly includes a removable portion which includes said light socket therein.

4. A device as in claim 3, wherein said back assembly also includes a beam adjustment part that allows adjusting the position of the light socket, to adjust a position of a projected beam.

5. A device as in claim 2, wherein said upper enclosure includes a ballast portion therein, and also includes connections for power and data signals.

6. A device as in claim 5, further comprising a menu display, allowing selection of functions, said menu being coupled to said yoke and having a menu surface on a surface of said yoke.

7. A device as in claim 1, further comprising a plurality of retaining surfaces coupled to said front surface of said lamp housing, said surfaces in a location to hold a coloring gel in a path of a projected light beam.

8. A lamp as in claim 1, wherein said front surface of said housing has a perimeter shape that is symmetrical on three sides relative to said opening, and asymmetrical on a fourth side relative to the other three sides and relative to said opening, wherein said asymmetrical shape provides a larger area on said fourth side of said opening relative to areas on said first and second and third sides of said opening, and wherein said lens rotating motor is located mounted to said larger area.

9. A lamp as in claim 1, further comprising a shield, on an outside of said housing, extending between said reflector assembly and said lens rotating motor, and shielding therebetween.

10. A lamp as in claim 1, further comprising an upper enclosure, separate from the yoke, and coupled to the yoke, said upper enclosure receiving data and power for the lamp.

11. A lamp as in claim 10, wherein said upper enclosure has an extending part, which extends outside of an outer perimeter thereof, said extending part adapted for mounting the lamp.

12. A lamp as in claim 10, wherein said upper enclosure is substantially rectangular, and further comprising a first mount on a first side of the upper enclosure, and a second mount on an opposite side of the upper enclosure, wherein both of said first amount and said second mounts comprise surfaces for holding a clamp, and both said first and second mounts extend outside of a perimeter of said upper enclosure.

13. A lamp comprising:

a lamp housing having a lamp front surface, defining a substantially round opening, and said lamp housing including at least one surface for rotatively holding a lens, said lamp housing also including a motor mounting surface on an opposite side of said lamp housing to said front surface, also having a rear outer surface including a first portion on a first side of said lens, a second portion on a second side of said lens, opposite said lens from said first portion, and said second portion being substantially the same area and shape as said first portion, a third portion on a third side of said lens adjacent to said first portion and said third portion being substantially the same area and shape as said first portion, and a fourth portion on a fourth side of said lens adjacent to said first portion and opposite to said third portion, said fourth portion having a different area than any of said first, second or third portions, and being non-symmetrical relative to any of said first, second and/or third portions, said fourth portion defining said motor mounting surface on said opposite side of said lamp housing to said front surface, said motor mounting surface being outside said housing, wherein said front surface of said housing has a perimeter shape that is the same on three sides relative to said opening, and different on a fourth side relative to the other three sides and relative to said opening, wherein said different shape provides a larger area on said fourth side of said opening relative to areas on said first and second and third sides of said opening; a lens rotating motor, mounted on said motor mounting surface outside said housing, and connected to operate in a way that allows rotating said lens; a reflector assembly, located adjacent said front surface, in a location to shine light through an area of said opening; a back assembly, coupled to a rear surface of said reflector assembly, and including a light socket that is operative to hold a light bulb in a location within said reflector, said back assembly extending by an amount that is effective to counterbalance at least a portion of an imbalance caused by an off center mounting of said lens rotating motor; and a yoke, coupled to said lamp housing, and operative to move said lamp housing in substantially pan and tilt directions.

14. A lamp as in claim 13, further comprising a shield, on an outside of said housing, extending between said reflector assembly and said lens rotating motor, and shielding therebetween.

15. A lamp as in claim 14, further comprising an upper enclosure, separate from the yoke, and coupled to the yoke, said upper enclosure receiving data and power for the lamp.

16. A lamp as in claim 15, wherein said upper enclosure has an extending part, which extends outside of an outer perimeter thereof, said extending part adapted for mounting the lamp.

17. A lamp as in claim 15, wherein said upper enclosure is substantially rectangular, and further comprising a first mount on a first side of the upper enclosure, and a second mount on an opposite side of the upper enclosure, wherein both of said first amount and said second mounts comprise surfaces for holding a clamp, and both said first and second mounts extend outside of a perimeter of said upper enclosure.

* * * * *